(12) United States Patent
Kim

(10) Patent No.: US 11,152,649 B2
(45) Date of Patent: Oct. 19, 2021

(54) BATTERY PACK

(71) Applicant: Samsung SDI Co., Ltd., Yongin-si (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 313 days.

(21) Appl. No.: 16/327,990

(22) PCT Filed: Jul. 6, 2017

(86) PCT No.: PCT/KR2017/007252
§ 371 (c)(1),
(2) Date: Feb. 25, 2019

(87) PCT Pub. No.: WO2018/048082
PCT Pub. Date: Mar. 15, 2018

(65) Prior Publication Data
US 2019/0229377 A1 Jul. 25, 2019

(30) Foreign Application Priority Data
Sep. 8, 2016 (KR) .................. 10-2016-0115682

(51) Int. Cl.
*H02J 7/00* (2006.01)
*H01M 10/42* (2006.01)
(Continued)

(52) U.S. Cl.
CPC ........... *H01M 10/425* (2013.01); *B60L 50/64* (2019.02); *B60L 58/15* (2019.02); *H01H 50/14* (2013.01);
(Continued)

(58) Field of Classification Search
None
See application file for complete search history.

(56) References Cited

U.S. PATENT DOCUMENTS 4,290,674 A * 9/1981 Kobori .................. G03B 7/087
396/227
8,415,929 B2 4/2013 Tabuta
(Continued)

FOREIGN PATENT DOCUMENTS

CN 101740839 A 6/2010
CN 201750190 U 2/2011
(Continued)

OTHER PUBLICATIONS

Extended European Search Report for corresponding European Patent Application No. 17848966.2, dated May 4, 2020, 6 pages.
(Continued)

*Primary Examiner* — Arun C Williams
(74) *Attorney, Agent, or Firm* — Lewis Roca Rothgerber Christie LLP

(57) ABSTRACT

A battery pack includes: a first switch connected between a first end of a battery and a first output terminal; a second switch including a first terminal and a second terminal which are connected to a second end of the battery, and a third terminal and a fourth terminal which are connected to a second output terminal, wherein the first terminal and the third terminal are electrically connected when the second switch is turned off, and the second terminal and the fourth terminal are electrically connected when the second switch is turned on; a pre-charge resistor connected between the third terminal of the second switch and the second output terminal; and a controller configured to control the second switch such that the second switch is turned on if a pre-charging period of time elapses after the first switch is turned on.

4 Claims, 8 Drawing Sheets

(51) Int. Cl.

| | |
|---|---|
| *B60L 50/64* | (2019.01) |
| *B60L 58/15* | (2019.01) |
| *H01M 50/20* | (2021.01) |
| *H01M 50/572* | (2021.01) |
| *H01M 50/581* | (2021.01) |
| *H01H 50/14* | (2006.01) |
| *H01H 50/54* | (2006.01) |
| *H01H 85/04* | (2006.01) |
| *H02H 7/18* | (2006.01) |
| *H02H 9/00* | (2006.01) |

(52) U.S. Cl.
CPC ............ *H01H 50/54* (2013.01); *H01H 85/04* (2013.01); *H01M 50/20* (2021.01); *H01M 50/572* (2021.01); *H01M 50/581* (2021.01); *H02H 7/18* (2013.01); *H02H 9/001* (2013.01); *H02J 7/00* (2013.01); *H01M 2010/4271* (2013.01); *H01M 2200/103* (2013.01); *Y02T 10/70* (2013.01)

(56) References Cited

U.S. PATENT DOCUMENTS

| | | | |
|---|---|---|---|
| 2010/0127663 A1* | 5/2010 | Furukawa | B60L 50/51 320/134 |
| 2010/0133914 A1 | 6/2010 | Kang et al. | |
| 2013/0106320 A1* | 5/2013 | Yugo | H02J 1/08 318/139 |
| 2015/0180250 A1 | 6/2015 | Fink | |
| 2016/0164328 A1* | 6/2016 | Kim | H02J 7/0029 320/112 |
| 2016/0241051 A1* | 8/2016 | Yang | H01M 10/44 |
| 2016/0243951 A1* | 8/2016 | Pritelli | H05K 7/1422 |
| 2017/0003353 A1* | 1/2017 | Seo | G01R 35/04 |

FOREIGN PATENT DOCUMENTS

| | | |
|---|---|---|
| CN | 102390279 A | 3/2012 |
| CN | 103085665 A | 5/2013 |
| CN | 105539156 A | 5/2016 |
| JP | 2894260 B2 | 5/1999 |
| JP | 2000-182598 A | 6/2000 |
| JP | 2004-111192 A | 4/2004 |
| JP | 2005-269742 A | 9/2005 |
| JP | 4748727 B2 | 8/2011 |
| JP | 2012-501620 A | 1/2012 |
| JP | 2015-154585 A | 8/2015 |
| KR | 1999-0065899 A | 8/1999 |
| KR | 20-0376475 Y1 | 3/2005 |
| KR | 10-2007-0047384 A | 5/2007 |
| KR | 10-2010-0027084 A | 3/2010 |
| WO | WO 2013/189626 A1 | 12/2013 |

OTHER PUBLICATIONS

Chinese Office Action, Corresponds to Application Serial No. CN 201780054996.6, dated Jun. 3, 2021, 15 pages (English translation included).

* cited by examiner

BATTERY PACK

CROSS-REFERENCE TO RELATED APPLICATION(S)

This application is a National Phase Patent Application of International Patent Application Number PCT/KR2017/007252, filed on Jul. 6, 2017, which claims priority of Korean Patent Application No. 10-2016-0115682, filed Sep. 8, 2016. The entire contents of both of which are incorporated herein by reference.

TECHNICAL FIELD

Exemplary embodiments relate to a battery pack.

BACKGROUND ART

Description of the Prior Art

Recently, as environmental regulations such as CO2 regulations have been strengthened, interest in environmentally friendly vehicles is increasing. Accordingly, automobile companies are actively researching and developing products for pure electric vehicles or hydrogen vehicles as well as for hybrid vehicles and plug-in hybrid vehicles.

Environmentally friendly vehicles are equipped with high-voltage batteries to store electrical energy that is obtained from a variety of energy sources.

A high-voltage electric field system of a vehicle uses high-voltage electric energy supplied from a high-voltage battery as driving or electrical energy of the vehicle.

In a high-voltage electrical system, a large amount of inrush current may be generated if a load and a battery are connected in series with a large voltage difference between a capacitor of the load and the high voltage battery. When the inrush current is generated, it may flow to a relay, causing relay sticking or serious damage, such as a fire due to device breakdown, to the battery/the high voltage circuit.

Accordingly, various attempts have been made to reduce the amount of inrush current.

DISCLOSURE

Technical Problem

An exemplary embodiment of the present invention has been made in an effort to provide a battery pack with reduced complexity in terms of controlling an inrush current.

Technical Solution

A battery pack according to an exemplary embodiment of the present invention may include: a first switch connected between a first end of a battery and a first output terminal; a second switch including a first terminal and a second terminal which are connected to a second end of the battery, and a third terminal and a fourth terminal which are connected to a second output terminal, wherein the first terminal and the third terminal are electrically connected when the second switch is turned off, and the second terminal and the fourth terminal are electrically connected when the second switch is turned on; a pre-charge resistor connected between the third terminal of the second switch and the second output terminal; and a controller configured to control the second switch such that the second switch is turned on if a pre-charging period of time elapses after the first switch is turned on.

The first and second switches may be initially turned off.

The first switch may be configured to electrically connect the first end of the battery and the first output terminal.

The second switch may include: a plurality of fixed contacts corresponding to each of the first terminal, the second terminal, the third terminal, and the fourth terminal; a movable contact configured to electrically connect the first terminal and the third terminal, or to electrically connect the second terminal and the fourth terminal; and an electromagnet configured to control the movable contact according to whether a current is applied thereto or not.

The battery pack may further include a fuse that is connected between the first end of the battery and the first switch.

Advantageous Effects

The battery pack according to the exemplary embodiments may reduce complexity in terms of controlling an inrush current.

MODE FOR INVENTION

Figure 1:
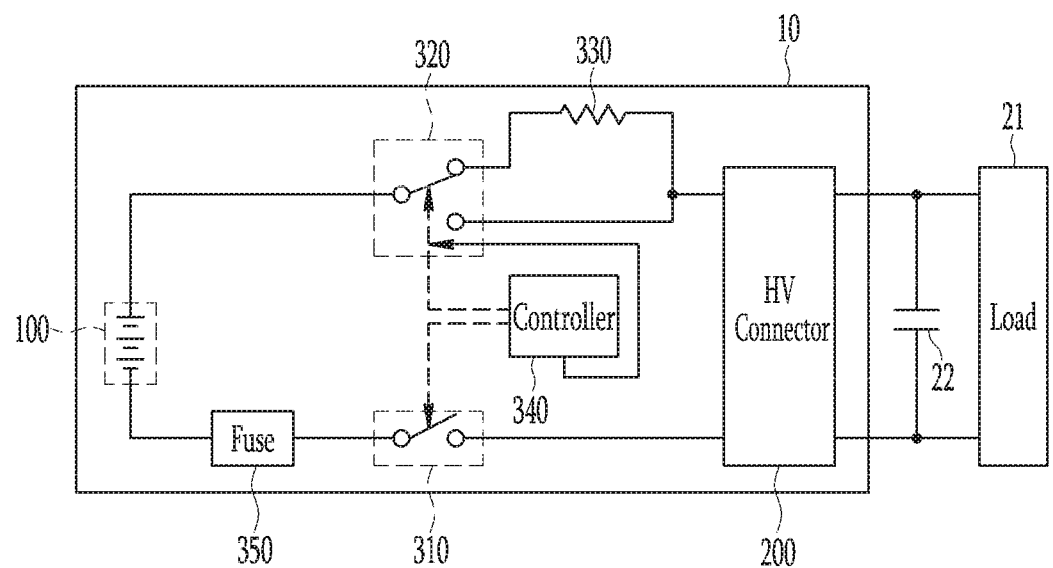
FIG. 1 is a schematic view of a battery pack according to an exemplary embodiment.

The present invention will be described more fully hereinafter with reference to the accompanying drawings, in which exemplary embodiments of the invention are shown. The embodiments may be embodied in many different forms and are not limited to the exemplary embodiments described herein.

In order to clearly illustrate the exemplary embodiments, parts not related to the description are omitted, and the same reference numerals are used for the same or similar elements throughout the specification. Therefore, like reference numerals used for like elements in the previous drawings may be used in following drawings.

In addition, the size and thickness of each element shown in the drawings are arbitrarily shown for convenience of explanation, and therefore the exemplary embodiments are not necessarily limited to those shown in the drawings. In the drawings, the thickness of layers, regions, etc. are exaggerated for clarity.

When it is described that an element is electrically connected to another element, it can be directly connected to the other element, or may be connected to the other element through a third element. The other element may include a switch, a resistor, a capacitor, or the like. When describing the exemplary embodiments, the expression "being connected to" means "being electrically connected to" when there is no expression "being directly connected to".

A battery pack according to exemplary embodiments will now be described in detail with reference to necessary drawings.

FIG. 1 is a schematic view of a battery pack according to an exemplary embodiment.

Referring to FIG. 1, a battery pack 10 according to the current exemplary embodiment may include a battery 100, a high voltage connector (high voltage interface, HV connector) 200, and a battery protection circuit connected between the battery 100 and the high voltage connector 200.

The battery 100 may be a high voltage battery that includes a plurality of cells connected in series or in parallel.

As a connector that connects the battery 100 and a load 21 such as a motor, the high voltage connector 200 may include output terminals that respectively connect opposite ends of the battery 100 to opposite ends of the load 21.

The high voltage connector 200 is connected between the battery 100 and the load 21 and a load-side capacitor 22, thereby transferring high voltage power supplied from the battery 100 to the load 21 and the load-side capacitor 22.

The battery protection circuit may include a plurality of switches 310 and 320, a pre-charge resistor 330, and a controller 340. The battery protection circuit may further include a fuse 350. Hereinafter, for ease of description, the switch 310 is referred to as a 'Main switch 310', and the switch 320 is referred to as a 'hybrid switch 320'.

The main switch 310 is electrically connected between the battery 100 and the high voltage connector 200, and may open/close a high current path between the battery 100 and the high voltage connector 200. The main switch 310 includes a terminal connected to the battery 100 and a terminal connected to the high voltage connector 200, and the terminal connected to the battery 100 and the terminal connected to the high voltage connector 200 may be electrically connected or cut off, thereby opening/closing the high current path.

The main switch 310 may be a contactor. As a switch that is opened/closed by an electromagnet, the contactor has a contact that is opened or closed according to a current flowing through the electromagnet. That is, the contactor is turned on as its contact is closed when operating power is supplied to the electromagnet, and is turned off as its contact is opened when the operating power supplied to the electromagnet is cut off.

The hybrid switch 320 may be electrically connected to the battery 100 and the high voltage connector 200, thereby connecting the high current path or a pre-charge path between the battery 100 and the high voltage connector 200.

The hybrid switch 320 includes a terminal connected to the battery 100, a terminal connected to the pre-charge resistor 330, and a terminal connected to the high voltage connector 200, and the terminal connected to the high voltage connector 200 may be selectively connected to either one of the terminal connected to the battery 100 and the terminal connected to the pre-charge resistor 330.

Figure 2A:
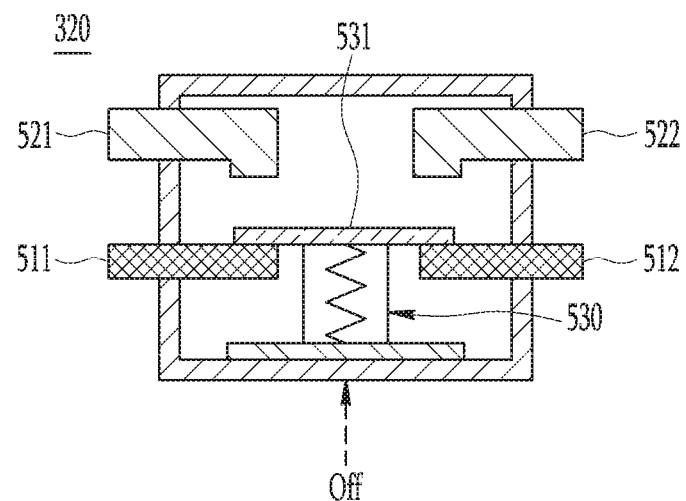
FIGS. 2A and 2B show an operation of a multi-contact switch according to an exemplary embodiment.
Figure 2B:
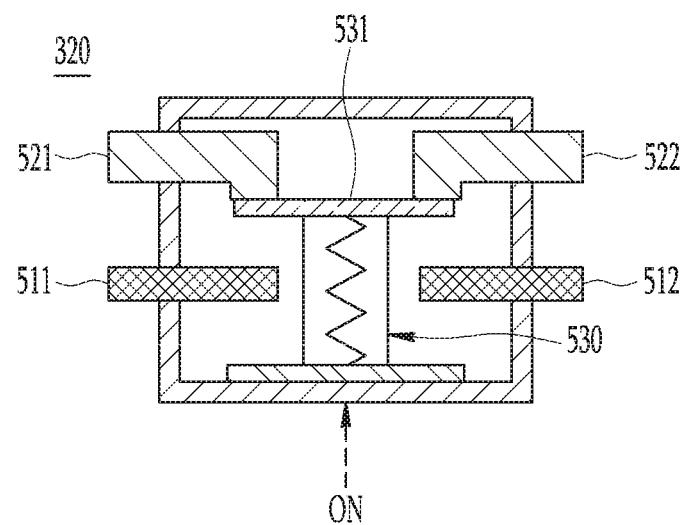

As shown in FIGS. 2A and 2B, the hybrid switch 320 may be a multi-contact contactor.

FIGS. 2A and 2B show an operation of a multi-contact switch according to an exemplary embodiment.

Referring to FIGS. 2A and 2B, a hybrid switch 320 consisting of a multi-contact contactor includes a plurality of fixed contacts 511, 512, 521, and 522, and a movable contact 531, and electrically connected contacts may be changed whether operating power is supplied to the electromagnet 530 or not.

Referring to FIG. 2A, when the hybrid switch 320 is in an initial state (or when it is turned off), that is, when it is in a state where an electromotive force is not generated because no operating power is supplied to an electromagnet 530, the fixed contacts 511 and 512 may be electrically connected by the movable contact 531.

On the contrary, when the hybrid switch 320 is turned on, operating power is supplied to the electromagnet 530 to generate an electromotive force. As the electromotive force is generated in the electromagnet 530, the movable contact 531 of the hybrid switch 320 moves as shown in FIG. 2B, and the movable contact 531 may electrically connect the fixed contacts 521 and 522, which are contacts other than those electrically connected when the hybrid switch 320 is turned off.

As described above with reference to FIGS. 2A and 2B, as a multi-contact contactor, the hybrid switch 320 may electrically connect different contacts when it is turned on or turned off.

Figure 3A:
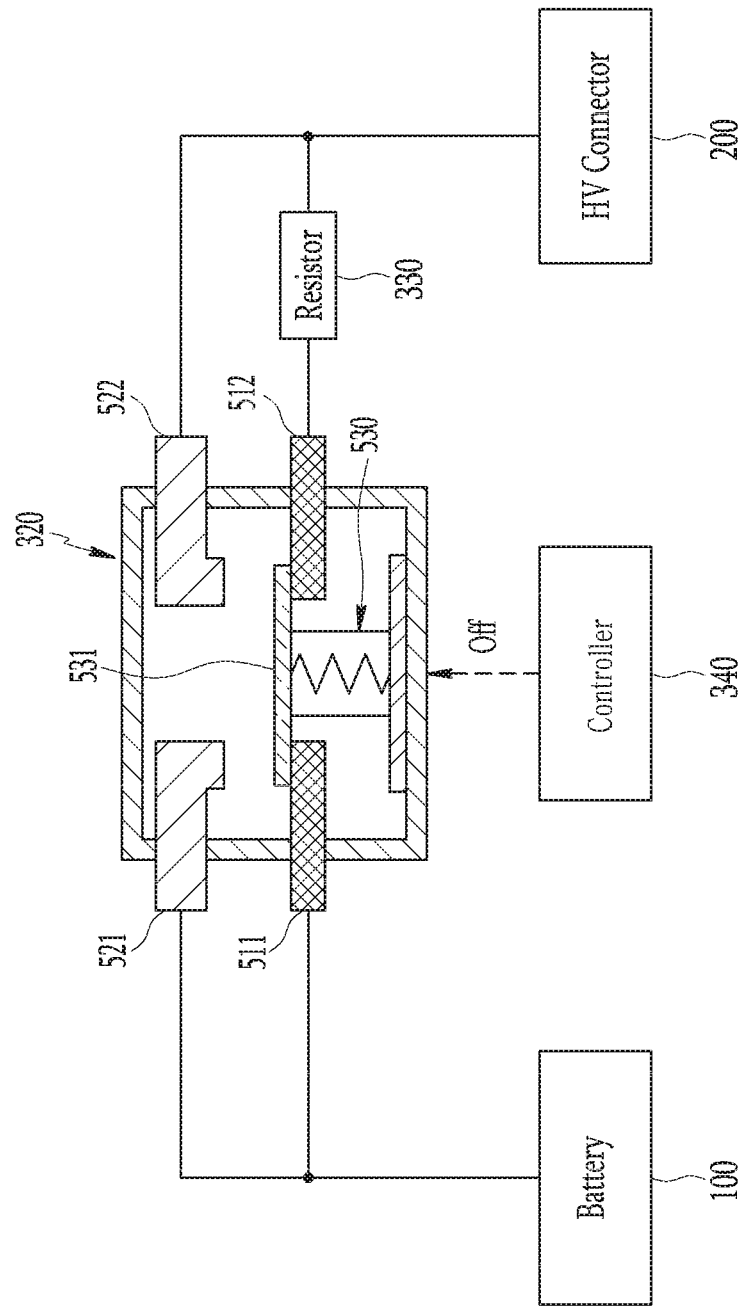
FIGS. 3A and 3B show an operation of a battery protection circuit when the multi-contact switch in FIGS. 2A and 2B is applied to the battery protection circuit in FIG. 1.
Figure 3B:
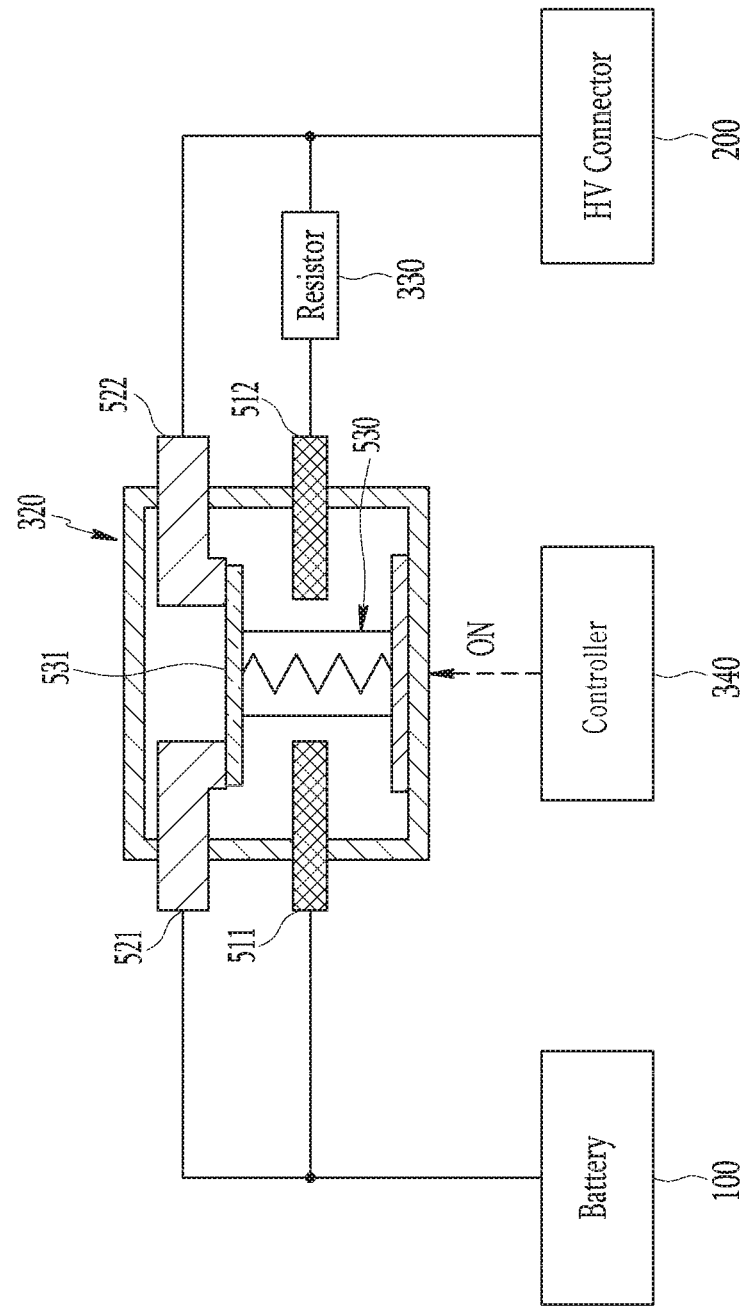

FIGS. 3A and 3B shows an operation of a battery protection circuit when the multi-contact contactor described with reference to FIGS. 2A and 2B is applied to the battery protection circuit in FIG. 1.

Referring to FIGS. 3A and 3B, fixed contacts 511, 512, 521, and 522 of a hybrid switch 320 may be respectively used as terminals 511 and 521 connected to a battery 100, a terminal 512 connected to a pre-charge resistor 330, and a terminal 522 connected to a high voltage connector 200.

Referring to FIG. 3A, when the hybrid switch 320 is turned off, the contact 511 connected to the battery 100 and the contact 512 connected to the pre-charge resistor 330 may be electrically connected to each other. Accordingly, the pre-charge resistor 330 may be electrically connected between the battery 100 and the high voltage connector 200 such that a pre-charge path between the battery 100 and the high voltage connector 200 is formed by the pre-charge resistor 330.

Referring to FIG. 3B, when the hybrid switch 320 is turned on, the contact 521 connected to the battery 100 and the contact 522 directly connected to the high voltage connector 200 may be electrically connected to each other. Accordingly, the battery 100 and the high voltage connector 200 may be directly connected to the high current path.

As described above with reference to FIGS. 3A and 3B, the hybrid switch 320 may form the pre-charge path by connecting the pre-charge resistor 330 between the battery 100 and the high voltage connector 200 when it is turned off, while forming the high current path by directly connecting the battery 100 and the high voltage connector 200 when it is turned on.

Referring back to FIG. 1, the pre-charge resistor 330 is connected between the hybrid switch 320 and the high voltage connector 200, and may perform a function of controlling an inrush current together with the load-side capacitor 22. One end of the pre-charge resistor 330 is connected to the hybrid switch 320.

The fuse 350 is connected to a high current path. For example, the fuse 350 may be connected between the battery 100 and the main switch 310. The fuse 350 may be cut off to open the high current path when an excessive current above a permissible current level flows through the high current path.

The controller 340 may control turn-on/off of the switches 310 and 320.

Figure 4:
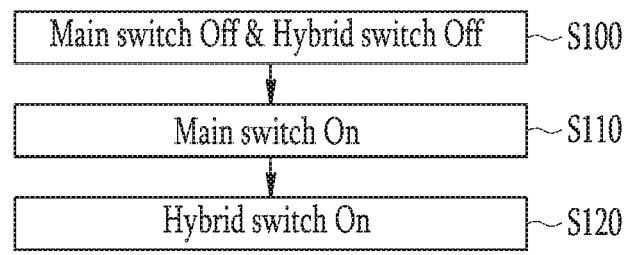
FIG. 4 is a schematic flowchart of a method for operating a battery protection circuit according to an exemplary embodiment.
Figure 5A:
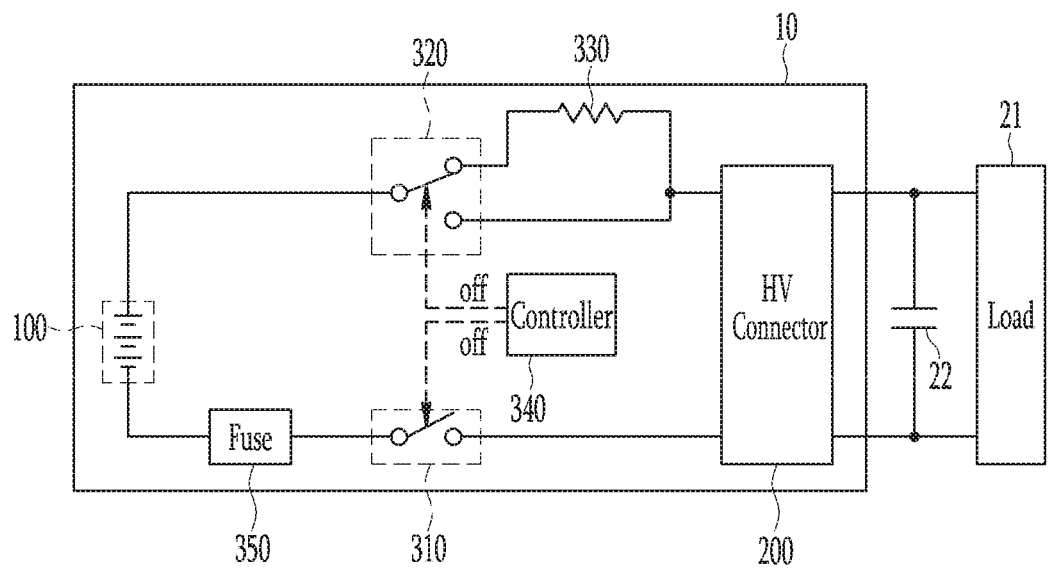
FIG. 5A to FIG. 5C show a method for operating a battery protection circuit according to an exemplary embodiment.
Figure 5B:
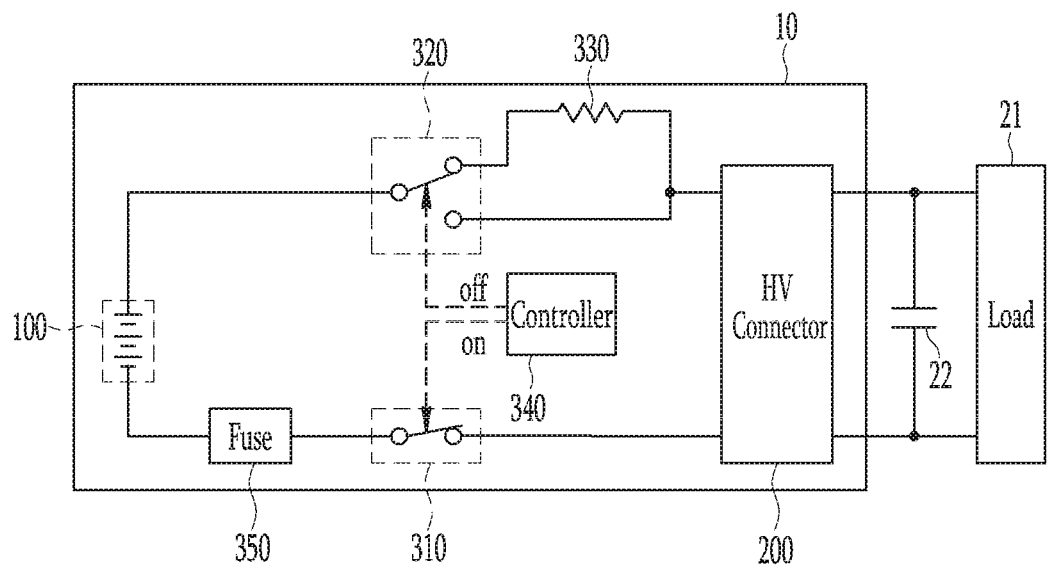
Figure 5C:
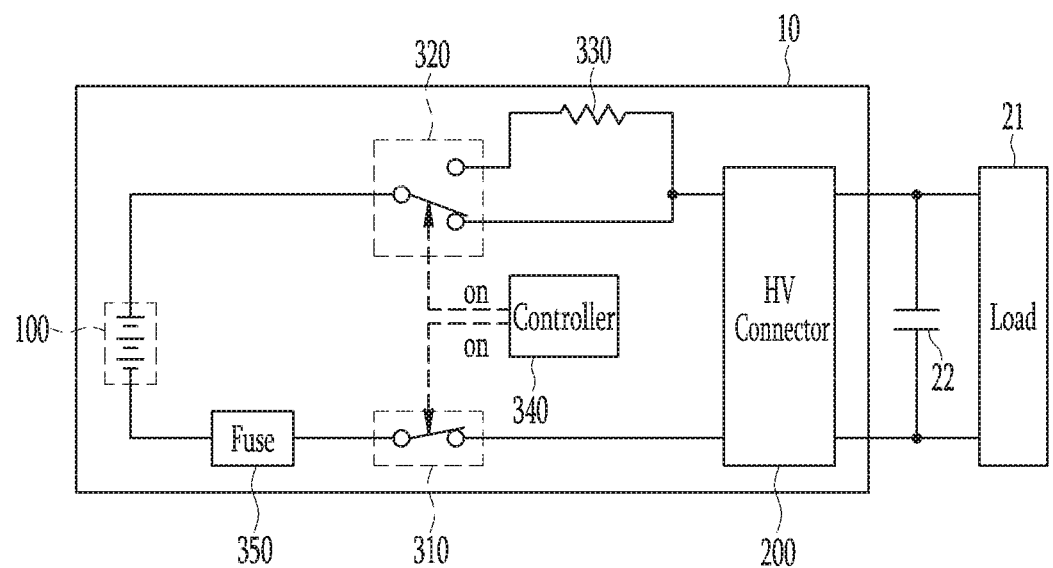

FIG. 4 is a schematic flowchart of a method for operating a battery protection circuit according to an exemplary embodiment, showing a method for operating a battery protection circuit to control an inrush current. FIG. 5A to FIG. 5C show a method for operating a battery protection circuit according to an exemplary embodiment.

Referring to FIG. 4, a controller 340 initially controls a main switch 310 and a hybrid switch 320 such that they are both turned off (S100).

Referring to FIG. 5A, when the main switch 310 and the hybrid switch 320 are both turned off, a high current path is opened because the main switch 310 is opened. In addition, a pre-charge resistor 330 is electrically connected between a battery 100 and a high voltage connector 200 by the hybrid switch 320.

Next, the controller 340 controls the main switch 310 such that it is turned on for precharging (S110).

Referring to FIG. 5B, if the main switch 310 and the hybrid switch 320 are both turned off and then the main switch 310 is switched to be turned on, the battery 100 and a load 21 are electrically connected to each other, and an inrush current is controlled by the pre-charge resistor 330 and a load-side capacitor 22 that are connected between the battery 100 and the load 21.

If a predetermined precharging period of time elapses after the main switch 310 is turned on, the controller 340 terminates the precharging, and controls the hybrid switch 320 such that it is turned on so as to connect the high current path.

Referring to FIG. 5C, as the main switch 310 and the hybrid switch 320 are both turned on, the precharging is terminated, and the high current path is connected between the battery 100 and the load 21.

As described above, in the battery pack 10 according to the current exemplary embodiment, the hybrid switch 320 is used, thereby making it possible to realize opening/closing of the pre-charge path and opening/closing of the high current path by using only the two switches 310 and 320. Compared with the prior art in which a switch connected to a pre-charge resistor is separately provided, this has the effect of reducing complexity when the controller 340 controls the inrush current.

In the battery pack 10 of FIG. 1, the pre-charge resistor 330 may also operate as a circuit breaker together with a fuse 350.

Figure 6A:
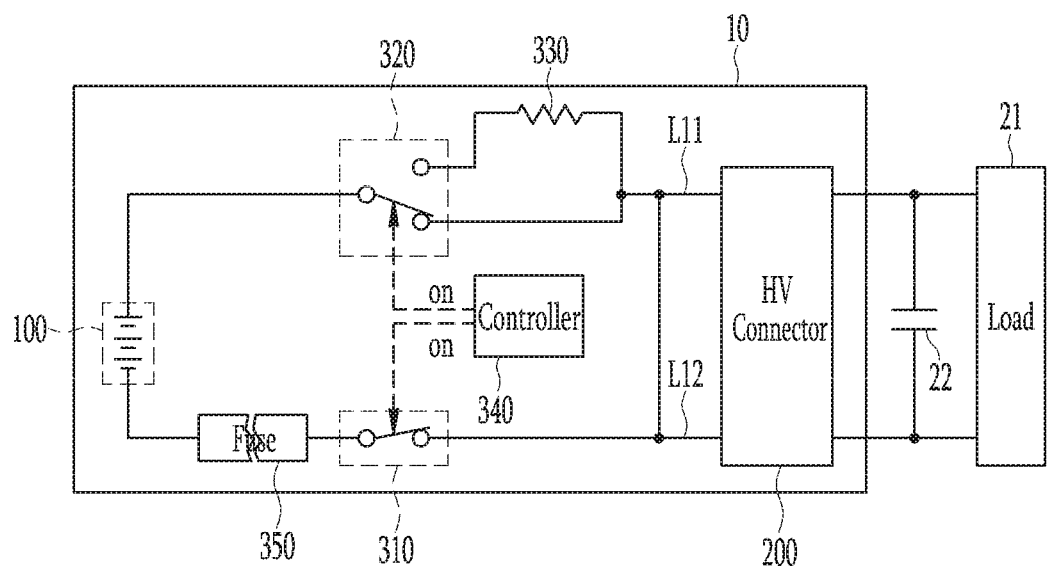
FIGS. 6A and 6B show examples in which a high current path is opened by a circuit breaker in a battery pack according to an exemplary embodiment.
Figure 6B:
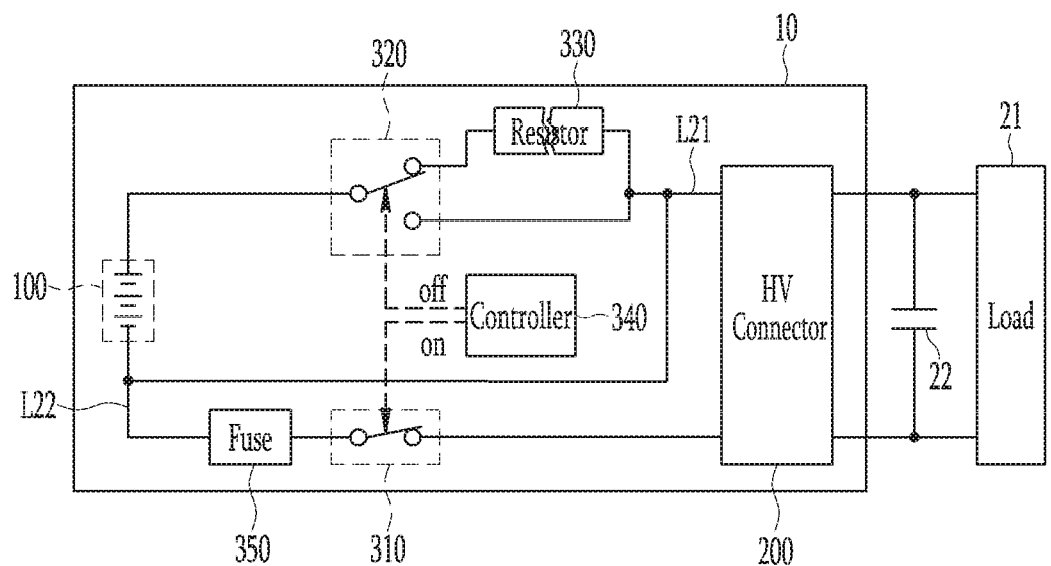

FIGS. 6A and 6B show examples in which a high current path is opened by a circuit breaker in a battery pack according to an exemplary embodiment.

FIG. 6A shows a case in which a high current path is connected between a battery 100 and a load 21, that is, a case in which a high voltage wire is short-circuited when a main switch 310 and a hybrid switch 320 are both turned on.

Referring to FIG. 6A, a high-voltage conducting wire L11 between the hybrid switch 320 and a high voltage connector 200 and a high-voltage conducting wire L12 between the main switch 310 and the high voltage connector 200 are short-circuited to each other.

Accordingly, an excessive current flows through the fuse 350, and the fuse 350 is cut off to open a high current path.

FIG. 6B shows, as an example, a case in which a precharging path is connected between the battery 100 and the load 21, that is, a case in which high-voltage conducting wires are short-circuited when the main switch 310 is turned on and the hybrid switch 320 is turned off.

Referring to FIG. 6B, it shows that a high voltage conducting wire L21 between the hybrid switch 320 and the high voltage connector 200 and a high voltage conducting wire L12 between the fuse 350 and the battery 100 are short-circuited to each other, making it difficult for the fuse 350 to open the circuit because the fuse 350 is not included in a path through which a short-circuit current flows.

The short circuit current generated by the short-circuited high-voltage conducting wires L21 and L22 may flow through the pre-charge resistor 330 via the hybrid switch 320, and destroy the pre-charge resistor 330 to open the pre-charge path between the battery 100 and the load 21.

As described above, in the battery pack 10 according to the current exemplary embodiment, the pre-charge resistor 330 can also operate as a circuit breaker when the high-voltage conducting wires are short-circuited, thereby reducing a high-voltage risk of the battery pack 10.

The accompanying drawings and the detailed description of the invention are only illustrative, and are used for the purpose of describing the present invention, but are not used to limit the meanings or scope of the present invention described in the claims. Therefore, those skilled in the art will understand that various modifications and other equivalent embodiments of the present invention are possible. Consequently, the true technical protective scope of the present invention must be determined based on the technical spirit of the appended claims.

DESCRIPTION OF SYMBOLS

21: load
22: load-side capacitor
10: battery pack
100: battery
200: high voltage connector
310, 320: switch
330: pre-charge resistor
340: controller
350: fuse

The invention claimed is:

1. A battery pack comprising:
a first switch connected between a first end of a battery and a first output terminal;
a second switch comprising:
   a first terminal and a second terminal, which are connected to a second end of the battery;
   a third terminal and a fourth terminal, which are connected to a second output terminal;
   a plurality of fixed contacts corresponding to each of the first terminal, the second terminal, the third terminal, and the fourth terminal;
   a movable contact configured to electrically connect the first terminal and the third terminal, or to electrically connect the second terminal and the fourth terminal; and
   an electromagnet configured to control the movable contact according to whether a current is applied or not;
a pre-charge resistor connected between the third terminal of the second switch and the second output terminal; and
a controller configured to control the second switch such that the second switch is turned on if a precharging period of time elapses after the first switch is turned on,
wherein the first terminal and the third terminal are electrically connected when the second switch is turned off, and wherein the second terminal and the fourth terminal are electrically connected when the second switch is turned on.

2. The battery pack of claim 1, wherein the first and second switches are initially turned off.

3. The battery pack of claim 1, wherein the first switch is configured to electrically connect the first end of the battery and the first output terminal.

4. The battery pack of claim 1, further comprising a fuse connected between the first end of the battery and the first switch.

\* \* \* \* \*